3,441,483
METHOD OF CONTROLLING FRACTIONATOR OR STRIPPER TEMPERATURE BY CONTROLLING REBOILED VAPOR FLOW
Walter C. Hart, Bartlesville, Okla., assignor to Phillips Petroleum Company, a corporation of Delaware
Filed June 7, 1967, Ser. No. 644,299
Int. Cl. B01d 3/42
U.S. Cl. 203—2    8 Claims

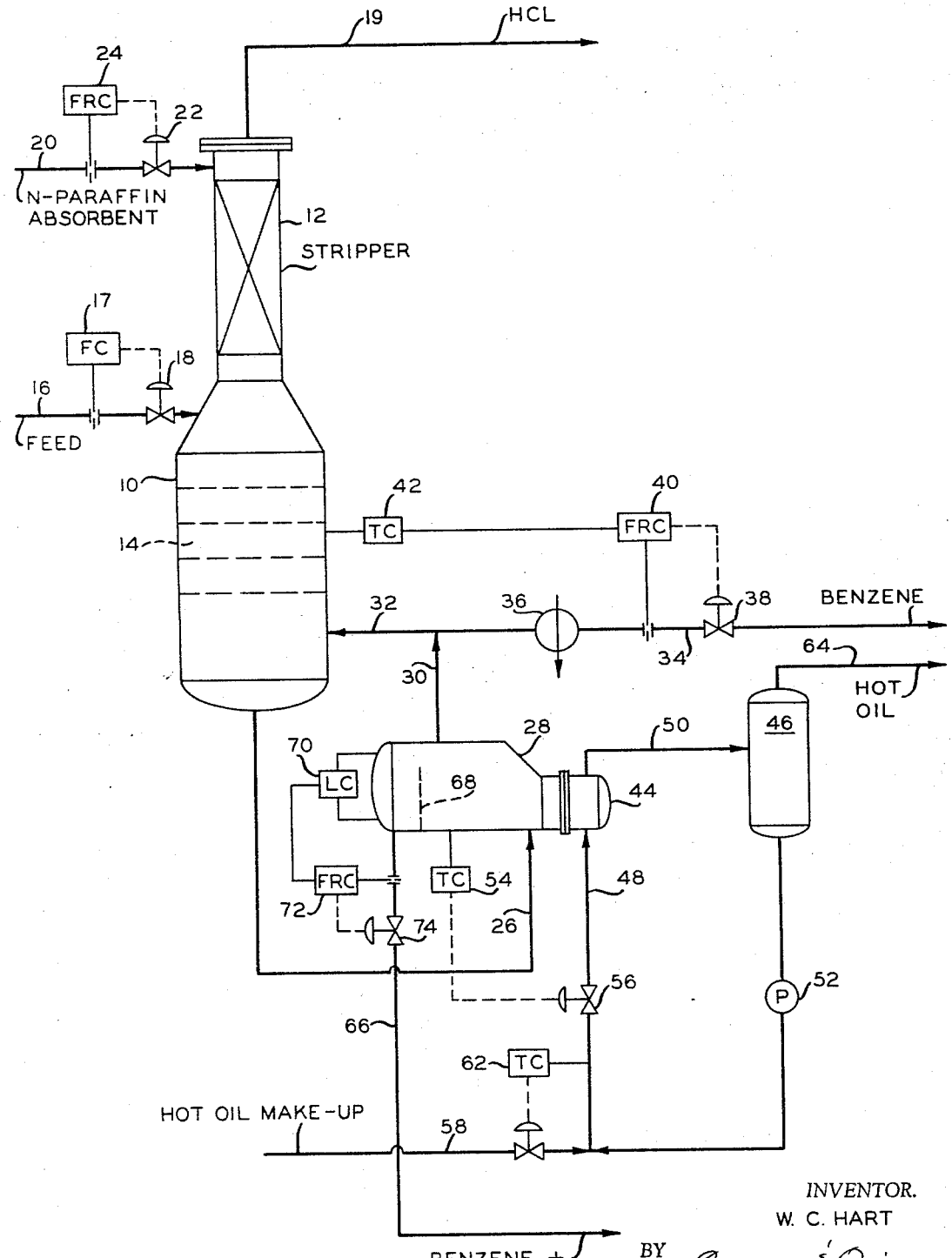

ABSTRACT OF THE DISCLOSURE

In controlling temperature in a fractionation column, a liquid bottoms stream from the column is passed to a reboiler where it is heated by indirect heat exchange with a heating fluid so as to vaporize a substantial portion of the bottom stream. A portion of the vaporized stream is passed into the bottom of the column as reboil fluid and the remaining portion is separately recovered. Control of column temperature is effected by sensing the temperature on a selected column tray and regulating the flow rate of one of the vapor streams in response to the sensed temperature to maintain a relatively uniform temperature on said tray.

---

This invention relates to a method for controlling the temperature in a fractionator or stripper column.

My copending application, Ser. No. 422,856, filed Dec. 31, 1964 and issued June 4, 1968 as U.S. Patent No. 3,386,891, discloses and claims a process or method of control for a stripper or fractionator which holds a set temperature on the control tray by regulating the flow of heating fluid to the reboiler heating coil. This method was workable but the response of the system was slower than desired. The reboiler also is used to flash excess benzene out of the system to be recycled to the alkylation process from which it originated. The reboiler, therefore, is large in size compared to the stripper or fractionator column. As a result, it has a large heat capacity and a very slow response to changes in reboiling requirements. This slow response is aided by the low temperature heating fluid used for reboiler heating because the ΔT between the hot oil and the reboiler is comparatively small, operating at a 6° F. approach.

The instant invention is concerned with an improved method of controlling the column temperature which eliminates the foregoing problems.

Accordingly, it is an object of the invention to provide an improved method of controlling the temperature in a fractionator such as a stripper column. Another object is to provide a method of controlling temperature in such a fractionator which is more responsive and has smaller time lag than in conventional control systems. Other objects of the invention will become apparent to one skilled in the art upon consideration of the accompanying disclosure.

A broad aspect of the invention comprises flashing a substantial portion of a bottoms stream from a fractionator column in the reboiler of the column, passing a portion of the flashed stream into the bottom of the column as reboil fluid, passing the remaining portion of the flashed stream to recovery, sensing the temperature on a selected tray in the column and regulating either the flow of vapor into the column bottom section or the flow of vapor to recovery in response to the sensed temperature to maintain a relatively constant preselected temperature on the tray. When controlling the flow of vapor to the bottom of the column in response to the sensed temperature, the flow is varied directly in response to the temperature whereas, when the control is on the vapor stream passing to recovery, the flow rate is controlled inversely to the temperature. In other words, the flow rate of reboil fluid is increased as the sensed temperature falls below the predetermined value and vice versa. In controlling the flow of vapor to recovery, the rate of flow is increased as the sensed temperature rises above the selected temperature and vice versa. The control of the flow of liquid bottoms product from the reboiler is effected with a liquid level control operatively connected with a flow rate controller on a motor valve in the effluent product line. Temperature of the liquid in the reboiler is maintained relatively constant by regulating the rate of flow of heating fluid thereto.

A more complete understanding of the invention may be had by reference to the accompanying drawing which diagrammatically illustrates a preferred embodiment of the invention.

Referring to the drawing, a fractionator 10 is provided with an absorption or reflux section 12 and with a number of trays in section 14 for effecting vapor-liquid contacting. Feed line 16 connects with the column for introducing feed to the trays at a uniform rate controlled by flow controller 17 operatively connected with motor valve 18. An overhead vapor line 19 connects with the top of the column and an absorption liquid feed line 20 containing a motor valve 22 operated by a flow rate controller 24, connects with the upper section of the column above the absorption section 12. A bottoms effluent line 26 connects with the bottom of column 10 and with reboiler 28. Reboiler vapor effluent line 30 connects with line 32 leading into the bottom section of the column and with line 34 which passes excess reboil fluid to recovery. Line 34 is provided with a cooler or condenser 36, a motor valve 38, and a flow rate controller 40 operatively connected with line 34 and with motor valve 38. A temperature controller 42 is sensitive to the temperature of liquid on a selected tray in column 12 and is in operatively control of flow rate controller 40.

Reboiler 28 is provided with a heat exchange tube bundle 44, the inlet of which is connected with a supply of hot oil in tank 46 by means of line 48. The outlet of tube bundle 44 is connected with tank 46 by means of line 50. Pump 52 circulates hot oil thru the system, including tube bundle 44, the flow thru which is controlled by temperature controller 54, which is sensitive to the temperature of liquid bottoms in reboiler 28 and in control of motor valve 56 in line 48. Hot oil makeup is supplied from line 58 which connects with a heater, not shown, and is provided with a motor valve 60 operated by a temperature controller 62 which is sensitive to the oil temperature in line 48. In this manner, the oil temperature in the oil circulating system is maintained at a selected level. Line 64 returns hot oil to the heater from tank 46 as hot oil makeup is added.

Effluent bottoms product is withdrawn from reboiler 28 thru line 66 from the end section of the reboiler downstream of overflow baffle 68. This baffle maintains a liquid level in the upstream section of the reboiler sufficient to maintain tube bundle 44 covered with liquid. Withdrawal of liquid bottoms products thru line 66 is controlled by level controller 70 which maintains a selected level in reboiler 28 by controlling flow rate controller 72 which is in operative control of motor valve 74.

The method of controlling fractionator temperature in accordance with the invention is applicable to the fractionation or stripping of any multi-component liquid stream, the components of which have substantially different boiling points. Thus, while the specific description of the process herein is directed to a specific application of the invention, it is not so limited as will be understood by one skilled in the art.

A specific application of the invention is in the stripping of HCl from an alkylate reaction mixture comprising HCl, benzene, n-paraffins, and phenylalkanes. The process of producing this alkylate mixture is fully disclosed in my aforesaid patent application. The alkylate reaction mixture from the process is fed thru line 16 under the control of flow controller 17 and motor valve 18 at a selected constant rate into fractionator or stripper 12 with heat being supplied to the liquid bottoms in the column by benzene vapor from line 32. HCl which has the lowest boiling point of any of the feed components is vaporized along with a minor proportion of the benzene in the feed and ascends the stripping section of the column where it is contacted with an absorption stream of normal paraffins recovered from the feed and introduced to the upper end of the column thru line 20 at a fixed rate under the control of flow rate controller 24 and valve 22. The n-paraffin absorbent removes benzene from the ascending stream of HCl. The n-paraffin absorbent and the HCl vapors make good contact in the absorption section of the tower which is provided with vapor liquid contacting material.

Bottoms liquid is passed thru line 26 into reboiler 28 where it is heated by indirect heat exchange with oil in tube bundle 44 so as to vaporize a substantial proportion of the benzene in the bottoms stream, the benzene passing overhead in vapor form thru line 30 from which a portion passes into the column bottoms thru line 32 and the remaining portion passes thru condenser 36 and line 34 to recycle to the alkylation process.

In the arrangement shown in the drawing, a selected predetermined temperature is maintained on an intermediate tray in the column by means of temperature controller 42 which senses the temperature of liquid on the tray and operates flow rate controller 40 in known manner to control the flow thru valve 38, increasing the flow rate as the sensed temperature tends to rise from the selected level and decreasing the flow rate as the sensed temperature tends to fall from the selected level. In this manner, the flow rate of benzene to recovery is varied inversely as the temperature varies. In the event the flow control is placed on the flow of benzene in line 32, the flow rate is varied directly as the temperature varies.

Flow rates and conditions of operation are now presented as illustrative of the invention and are not to be construed as unnecessarily limiting the same.

In operating in accordance with the invention, in apparatus substantially as shown in the drawing, in separating HCl from an alkylate reaction mixture, the operating conditions and stream contents obtained are set forth below.

of the column. By the method of the invention, a temperature of 195° F.—about 1° F. was maintained on the sixth tray. This novel temperature control provides much smoother column operation than was heretofore possible. Controlling the temperature of the oil circulating thru the tube bundle in the reboiler at a constant level and maintaining a uniform reboiler temperature, facilitates the temperature control in the column.

Certain modifications of the invention will become apparent to those skilled in the art and the illustrative details disclosed are not to be construed as imposing unnecessary limitations on the invention.

I claim:

1. A method of heating a liquid in the bottom of a fractionating zone which comprises the steps of:
    (a) passing a bottoms stream from said zone into a reboiler in indirect heat exchange with a heating fluid so as to vaporize a substantial portion of said bottoms stream and leave a substantial liquid portion;
    (b) removing said liquid portion of step (a) as bottoms product;
    (c) passing a first substantial portion of the vaporized portion of step (a) into the bottom of said fractionation zone as reboil fluid;
    (d) withdrawing a second remaining portion of said vaporized portion of step (a) as product;
    (e) sensing the temperature on a selected tray in said fractionating zone; and
    (f) regulating the flow rate of one of said first portion and second portion of steps (c) and (d) so as to maintain a relatively constant selected temperature in step (e).

2. The process of claim 1 wherein step (f) comprises increasing the flow rate of said second portion when the sensed temperature rises from the selected temperature and decreasing the flow rate thereof when the sensed temperature lowers from the selected temperature on said tray.

3. The process of claim 1 wherein step (f) comprises decreasing the flow rate of said first portion when the sensed temperature rises from the selected temperature and increasing the flow rate thereof when the sensed temperature lowers from the selected temperature on said tray.

4. The process of claim 1 wherein a feed stream comprising HCl, benzene, n-paraffin, and phenylalkanes is introduced to said fractionation zone to fractionate same

TABLE

| | | | Pounds per hour | | | |
|---|---|---|---|---|---|---|
| Line No | Feed (16) | O.H.V. (19) | Reflux (20) | Reboil vapors (32) | Benzene recycle (34) | K.P. (66) |
| HCl | 1,164 | 1,164 | | | | |
| Benzene | 28,781 | | | 20,814 | 17,241 | 11,540 |
| Paraffins | 21,859 | 18 | 2,782 | 413 | 343 | 24,280 |
| Phenylalkanes | 6,510 | | | | | 6,510 |
| Diphenylalkanes | 707 | | | | | 707 |
| AlCl$_3$ | 21 | | | | | 21 |
| Total | 59,042 | 1,182 | 2,782 | 21,227 | 17,584 | 43,058 |

The temperature of the feed in line 16 is about 95° F. and the total flow is about 4,820 barrels per day. The temperature in the kettle is maintained at about 244° F. at a pressure of 20 p.s.i.a. (pounds per square inch absolute). The temperature in the top of the column is 50° F. and the pressure is 15 p.s.i.a., the rate of flow of HCl vapor being about 8,410 s.c.f.h. Paraffin absorbent enters the top of the column at a temperature of 50° F. The bottoms product in line 66 is at about 244° F. and 20 p.s.i.a., the rate of withdrawal being about 3,692 barrels per day. The flow rate of benzene vapor in line 32 is about 1,652 barrels per day at a temperature of about 244° F. and a pressure of about 20 p.s.i.a. The rate of benzene absorbent is about 1,368 barrels per day.

The system is operated with the temperature control on the sixth tray, there being twelve trays in section 14 into an overhead stream comprising essentially HCl, and a bottoms stream comprising essentially the remaining components of said stream; said bottoms stream is the feed stream to step (a); the vaporized portion of said bottoms stream in step (a) comprises essentially benzene; and the bottoms product of step (b) comprises essentially n-paraffin, phenylalkanes, and remaining liquid benzene.

5. The process of claim 4 wherein operating conditions in said fractionating zone comprise a top temperature of about 50° F. at a pressure of about 15 p.s.i.a. and a bottoms temperature of about 244° F. at a pressure of about 20 p.s.i.a.

6. The process of claim 1 wherein the removal of said liquid portion in step (b) is controlled by sensing the liquid level of liquid in said reboiler and controlling the rate of removal to maintain a selected liquid level therein.

7. The process of claim 1 wherein the temperature of the liquid bottoms in said reboiler is sensed and the flow rate of the heating fluid in step (a) is controlled in response to the sensed temperature to maintain a selected relatively constant reboiler temperature.

8. The process of claim 7 wherein the temperature of said heating fluid passing into said reboiler is maintained substantially constant.

References Cited

UNITED STATES PATENTS

| | | |
|---|---|---|
| 2,545,671 | 3/1951 | Passino. |
| 2,886,616 | 5/1959 | Mertz et al. _____ 196—132 |
| 2,917,437 | 12/1959 | Kleiss et al. _____ 203—2 |
| 3,208,230 | 9/1965 | Fourroux _____ 196—132 |
| 3,223,749 | 12/1965 | Van Pool et al. _____ 196—132 |
| 3,249,518 | 5/1966 | Vautrain et al. _____ 202—160 |
| 3,249,519 | 5/1966 | Cabbage et al. _____ 203—2 |
| 3,301,778 | 1/1967 | Cabbage _____ 203—2 |

WILBUR L. BASCOMB, JR., *Primary Examiner.*

U.S. Cl. X.R.

203—98, 100; 202—160; 260—671, 674; 23—154; 196—132